United States Patent [19]

Kirkham

[11] 3,848,312

[45] Nov. 19, 1974

[54] METHOD OF PRODUCING A METAL OBJECT WITH HIGH RELIEF AND HAVING A PROOF FINISH FROM POWDERED METAL

[75] Inventor: Kathleen E. Kirkham, Staten Island, N.Y.

[73] Assignee: Franklin Mint Corporation, Franklin Center, Pa.

[22] Filed: Sept. 18, 1973

[21] Appl. No.: 398,361

[52] U.S. Cl. ................ 29/160.6, 29/182, 29/182.3, 29/420.5, 29/DIG. 31, 40/27.5, 72/376

[51] Int. Cl. ................ B22f 3/24

[58] Field of Search..... 29/420.5, DIG. 31, DIG. 37, 29/160.6, 182.3, 182; 40/27.5; 72/376, 412

[56] References Cited

UNITED STATES PATENTS

| | | | |
|---|---|---|---|
| 438,397 | 10/1890 | Benfield | 29/160.6 |
| 1,789,153 | 1/1931 | Osborne | 161/18 X |
| 2,689,492 | 9/1954 | Ensign | 29/420.5 |
| 3,464,252 | 9/1969 | Piper et al. | 29/420.5 X |
| 3,672,881 | 6/1972 | Sowko | 29/182.3 X |

FOREIGN PATENTS OR APPLICATIONS

| | | | |
|---|---|---|---|
| 522,633 | 6/1940 | Great Britain | 29/160.6 |

OTHER PUBLICATIONS

O. Smart, "Powder Metallurgy," Office of Technical Services, Department of Commerce, Washington, D.C., (1947) PB L 81841, pp. 11–13.

*Primary Examiner*—C. W. Lanham
*Assistant Examiner*—D. C. Reiley, III.
*Attorney, Agent, or Firm*—Seidel, Gonda & Goldhammer

[57] ABSTRACT

A method for producing a metal object which comprises a base and an adjacent image area raised in high relief above the base. The method comprises the steps of filling a die recess with a metal powder which will constitute the desired object; compacting the metal powder within the die recess to produce a relief compact; sintering the relief compact according to preferred temperatures and intervals of time; and stamping the sintered compact in a coining press. The metal object formed by this process includes an area raised 0.375 inches or more in relief above the base of the object. In addition, the base of the object has a proof finish.

12 Claims, 8 Drawing Figures

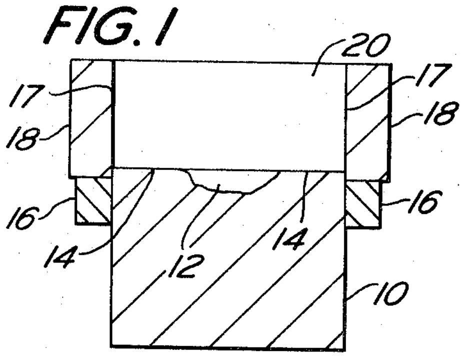
FIG. 1
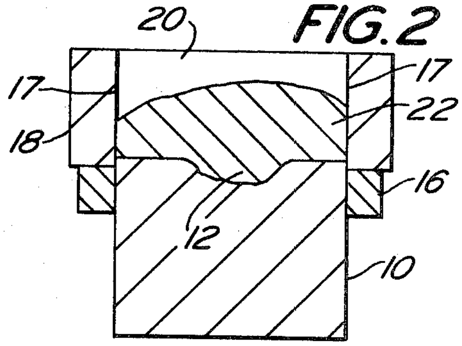
FIG. 2
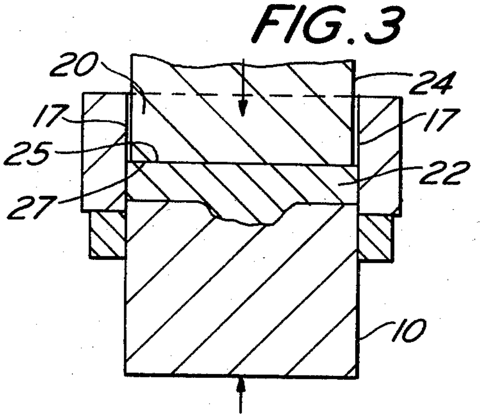
FIG. 3
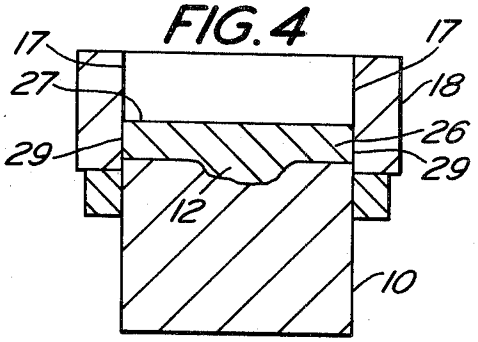
FIG. 4
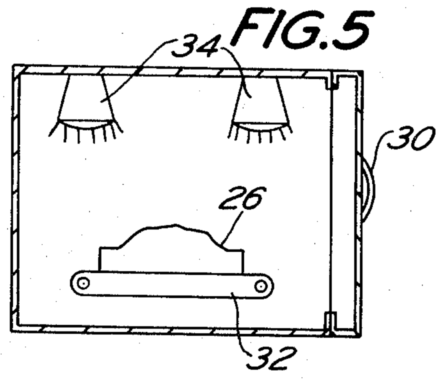
FIG. 5
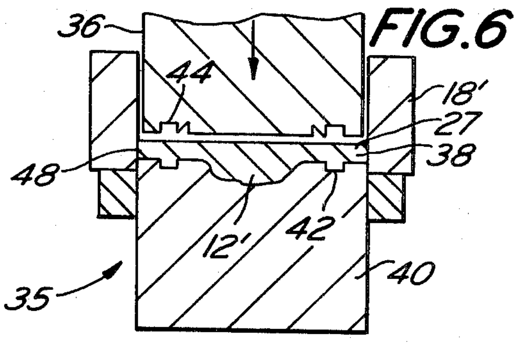
FIG. 6
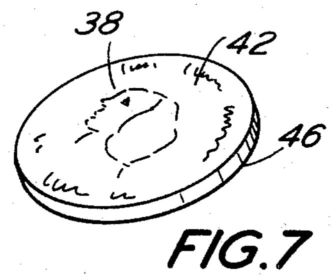
FIG. 7
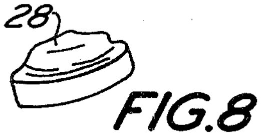
FIG. 8
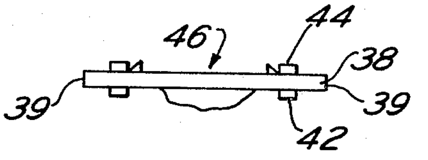
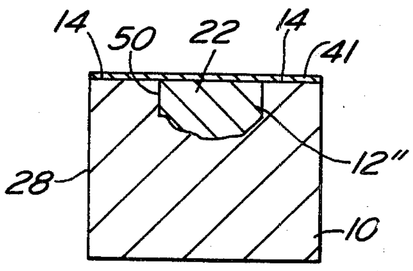

METHOD OF PRODUCING A METAL OBJECT WITH HIGH RELIEF AND HAVING A PROOF FINISH FROM POWDERED METAL

BACKGROUND OF THE INVENTION

The present invention relates to the production of a metal object which bears a design in high relief on the object face.

Methods are well-known in the prior art for producing a metal object which bears a design in relief. For example, a common technique for achieving the desired image or design consists of stamping the design on the metal object and annealing the object in order to prepare it for subsequent stamping with the same design. This process is repeated until the design appears raised in relief above the face of the object by the desired height.

There are significant problems associated with the methods of the prior art. In general, where the desired relief is formed by stamping the metal object once without annealing, relief elevations of approximately 0.100 inches or more are not attainable. In order to attain the desired height in relief the metal may be repeatedly stamped without annealing, but then the metal will become hard and brittle and defects will form in the metal surface. Consequently, the object will lack a proof finish. Further, it will be necessary to mask the resulting defects. One method for masking the defects arising from repeated stamping includes oxidizing the metal surface. For example, according to conventional techniques, the metal may be treated with a solution containing copper sulfate. Following oxidization, the metal surface is buffed to achieve the desired masking effect.

Although relief elevations exceeding 0.100 inches may be obtained by the process of repeated stamping and annealing of the metal object, this process is cumbersome. Following each stamping the metal object must be annealed or softened to prepare it for successive stamping. In addition, the final metal surface will lack a proof finish. In particular, the surface will have a milky appearance due to repeated annealing.

In general, then, significant relief elevations may not be obtained by prior art methods without detrimental effects to the surface finish. The metal object produced by the methods of the prior art will lack a proof finish. Moreover, a multiplicity of steps is required to obtain an object with a relief elevation exceeding 0.100 inches, with attendant expenditures of time and money.

Accordingly, a principal advantage of the present invention is that it provides a direct method, comprising a minimal number of steps, for producing a metal object possessing both characteristics of considerable height in relief and proof finish.

Another advantage of the present invention is that it provides a method for producing a metal object having an area raised in relief considerably more than 0.100 inches above the adjoining object face. More specifically, the present invention provides a method for producing a metal object having an area raised in relief as much as 0.375 inches or more above the adjoining object face.

In addition, an advantage of the present invention is that it provides a method for achieving significantly great elevations of the previously described areas in relief, while ensuring a proof finish on the adjoining object face without oxidizing or related steps.

Other objects will appear hereinafter.

BRIEF SUMMARY OF THE INVENTION

Utilizing the technique of powder metallurgy the method of the present invention avoids those detractions of the prior art described above.

According to the method of the present invention, a metal powder is introduced into a die cavity and in a die recess; the powder is compacted within the cavity and the recess to form a relief compact; the relief compact is sintered in a sintering chamber to produce a durable sintered compact, the relief compact undergoing no significant dimensional change; and the sintered compact is stamped in a coining press.

The method is particularly suited for the production of metals, coins, medallions and similar objects, although other types of metal objects are also contemplated.

Sintering is conducted at a relatively low temperature in order to ensure a sufficiently cohesive compact to undergo stamping. By using a relatively low temperature to sinter, any appreciable dimensional change in the compact is avoided. Consequently, the sintered compact is fitted immediately into a coining press for stamping and embossing.

A coin or medal formed by the method of the present invention will have an area raised in relief as such as 0.375 inches or more above the coin face or base. Such heights significantly exceed those attainable by prior art methods.

In addition, the face of the coin produced by the method of the present invention will retain a proof finish without the use of oxidizing or related polishing techniques. No masking is required.

Finally, by a simple variation in the nature of the die recess used in the present invention, viz. by dropping the recess, a cameo is produced with the desirable high relief and proof finish previously described.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIG. 1 15 a view in cross-section of the die and collar assembly used in a preferred embodiment of the method of the present invention.

FIG. 2 is a view in cross-section of the die and collar assembly of FIG. 1 with a metal powder introduced therein.

FIG. 3 is a view in cross-section of the die and collar assembly of FIG. 1 in conjunction with a powder press die.

FIG. 4 is a view in cross-section of the die and collar assembly of FIG. 1 with a relief compact therein.

FIG. 5 is a view in cross-section of a sintering oven with a relief compact therein.

FIG. 6 is a view in cross-section of a stamping die and a coining press with the sintered relief compact therein.

FIG. 7 is a view in cross-section of the finished product of the present invention.

FIG. 8 is a view in cross-section of the modified die recess of the present invention used in manufacturing a cameo.

DETAILED DESCRIPTION OF THE INVENTION

Referring to the drawings in detail wherein like numerals indicate like elements, there is shown in FIG. 1 a die 10 used in the method of the present invention. The die 10 comprises a die recess 12 and die lands 14. Die recess 12 is formed according to the desired image to be carried by the relief area. More specifically, die recess 12 is engraved with the negative of the desired image. Die lands 14 surround the die recess 12 and are located within the plane from which die recess 12 is formed.

The dies used in the present invention may be made of any suitable conventional material, such as steel alloy. The die recess may be formed by conventional engraving techniques or etching. As is known in the art, the recess may be treated to produce a desired finish. For example, sand or diamond blasting may be used to produce a frosted finish and polishing may be used to produce a shiny finish.

As depicted in FIG. 1, in a preferred embodiment of the present invention ring fastener 16 embraces the upper portion of die 10. In addition, ring fastener 16 supports collar 18. Alternatively, although not shown, collar 18 may be supported by means of a conventional die set. Die 10 and collar 18 define die cavity 20, disposed immediately above die recess 12.

According to the method of the present invention, metal powder 22 is introduced into die recess 12 and die cavity 20, as shown in FIG. 2. In general, metal powder 22 will rise within die cavity 20 to a height which will depend on the desired thickness of metal adjoining the area to be raised in relief in the product of the present invention. Typically, powder 22 may be of size from 0.50 to 15 microns. However, other size powders may also be used.

In FIG. 3, a powder press die 24 is shown descending in physical contact with powder 22 in die cavity 20. The downward pressure exerted by die 24 and the upward pressure exerted by die 10 will compress powder 22 into a cohesive relief compact 26 as in FIG. 4. As depicted in FIG. 3, powder press die 24 and die 10 move in opposite directions, approaching each other as in a common dual action press. However, if desired, die 10 may be stationary. In a preferred embodiment, compaction will be carried out at a pressure of about 20 to 60 tons per square inch.

While powder press die 24 is shown with a flat surface 25, the surface 25 may be suitably engraved to produce a desired relief design on the reverse side 27 of the coin or medal 26.

Upon completion of the compacting step in die 10, relief compact 26 is sufficiently cohesive to permit removal from die cavity 20 and die recess 12 by ejection according to methods common in the art. It will not be necessary to lubricate die recess 12 in order to remove relief compact 26. This is a highly desirable feature of the present invention. Lubrication of die recess 12 would be unacceptable because a lubricant would mar the surface of relief compact 26, precluding a proof finish. In contrast, the interior walls 17 of collar 18 may be lubricated to facilitate extraction of compact 26. Lubrication of collar 18 will not endanger the desired proof finish while it will prevent scoring of the edges 29 of relief compact 26.

Following compaction, relief compact 26 is sintered in sintering chamber 30 as shown in FIG. 5. Relief compact 26 is supported by tray support 32 and heated by heat sources 34 to produce sintered compact 38, FIG. 6. Sintering will take place at a relatively low temperature and short interval of time. The sintering temperature need only be high enough and the time interval long enough to produce a good bond between the particles of the metal powder without causing applicable dimensional changes in the relief compact 26. Such temperatures and time intervals will vary depending on the particular metal or metals used, and may be readily determined with a minimum of experimentation by one of ordinary skill in the art. For example, sintering of gold or silver will take place at approximately 400° F and for approximately 2 hours. Should the temperature be too high or the time too long, compact 26 may begin to melt. The definition of the image carried in relief on compact 26 will suffer accordingly. By keeping the temperature low during sintering the desired definition is maintained. Moreover, in the preferred range of temperatures of the present invention, normal shrinkage of relief compact 26 is avoided. This shrinkage would otherwise result in a poor fit in coining press 34, FIG. 6.

Where relief compact 26 comprises gold or silver or other non-oxidizing metals, it will not be necessary to provide a special reducing atmosphere in sintering chamber 30. Thus, during the sintering step, any clean atmosphere will suffice where such metals are used. If, however, other than non-oxidizing metals are preferred, such as copper or nickel, it may be necessary to perform the step of sintering in a reducing atmosphere to avoid formation of oxide films on the metal surfaces and to ensure bonding of the metal particles.

The final step of the present invention is indicated in FIG. 6. There, striking die 36 is brought into physical contact with sintered compact 38 shown seated in coining die recess 12 in bottom die 40 of coining press 35. Coining die recess 12′ is formed identically to recess 12 in order to accommodate the relief portion of sintered compact 38. Bottom die 40 also may carry engraving for forming any other obverse side design 42.

Striking die 36 may carrying engraving for forming reverse side design 44. Designs 44 and 42 are embossed upon sintered compact 38 when striking die 36 is brought into physical contact with sintered compact 38. This striking may be repeated several times in order to obtain the desired height in relief for designs 44 and 42. Preferably, the striking die 36 will impinge on sintered compact 38 with a total force of approximately 100 to 300 tons.

Because relief compact 26 will expand slightly upon extraction from collar 18 in FIG. 4, the inner diameter of collar 18′, shown in FIG. 6, is approximately .010 inches larger than the inner diameter of collar 18 of FIG. 4.

The final product of the present invention is illustrated in FIG. 7. There, sintered compact 38 is shown embossed with obverse side design 42 and reverse side design 44. If desired, the final product 46 may bear reeding along its edges 39. The reeding is obtained by forming the negative of the desired reeding along the interior wall 48 of collar 18′ as depicted in FIG. 6.

Although a final metal object of uniform composition has been described, it will be obvious to one of ordinary skill in the art that the method of the present invention may be employed to produce a metal object which includes more than one metal. For example, my co-pending application Ser. No. 377,378, filed July 9, 1973 and entitled "Method for Producing a Bi-Metal Object and Product Thereof" discloses a method for producing a bi-metal object with particular attractive characteristics. The method of the present invention may be implemented to obtain the additional characteristic of high relief area elevations up to 0.375 or more inches. In this manner, a bi-metal object will be produced with the advantages of both inventions.

The method of the present invention may also be modified to produce a highly desirable cameo. In FIG. 8, a cameo 28 is shown after compaction and sintering according to the previously described method as modified. In particular, die recess 12 is replaced by inset die recess 12'' contained within die 10 as shown in FIG. 8. There is no need to use a ring fastener or a collar. Resilient cover 41 is supported by lands 14 and metal powder 22 inside inset recess 12''. Inset recess 12'' will bear engraving identical to that of recess 12. However, unlike recess 12, inset recess 12'' will be lowered by a preferred distance from the plane of lands 14. This relationship is illustrated in FIG. 8 by inset 50. The depth of inset 50 will depend upon the preferred thickness of backing for the relief of cameo 28.

In accordance with the present invention, inset die recess 12'' is filled with metal powder 22. For best results, recess 12'' is slightly overfilled, This ensures proper compaction. Resilient cover 41 is then placed atop lands 14 and in direct physical contact with metal powder 22. Cover 41 is pressed against powder 22 according to the method described in my co-pending application Ser. No. 377,378, filed July 9, 1973 and entitled Method for Producing Bi-Metal Object and Product Thereof. As described therein a powder press (not shown) is brought in direct physical contact with cover 41, pressing cover 41 against lands 41 and powder 22. In this manner, proper compaction of powder 22 is obtained. Once the powder 22 is compacted, it is sintered as previously described. The result is a cameo 28. Further steps which are required in the prior art, such as die cutting, are unnecessary. The cameo 28 will possess those attributes of high relief and proof finish inherent in all metal objects formed by the method of the present invention.

The present invention may be embodied in other specific forms without departing from the spirit or essential attributes thereof and, accordingly, reference should be made to the appended claims, rather than to the foregoing specification as indicating the scope of the invention.

I claim:

1. A method for producing a proof finish on a metal object having at least one portion of its surface area raised more than 0.100 inches in relief, comprising the steps of:

a. providing a die and die cavity, said die comprising a die recess which is engraved with the negative of the relief to be formed and which is greater than 0.100 inches in depth within said die, said die cavity disposed immediately above said die recess;
b. filling said die recess with a metal powder;
c. introducing said metal powder into said die cavity;
d. compacting said metal powder inside said die cavity and said die recess to form a relief compact;
e. sintering said relief compact at a temperature and for a time sufficient to produce a durable sintered compact, but insufficient to produce any significant dimensional change in said relief compact;
f. inserting said sintered compact in a coining press, said coining press comprising a coining die recess identical in shape and dimension to said die recess of step; (a);
g. striking said sintered relief compact to form a final relief object having a proof finish; and
h. ejecting said final relief object.

2. A method according to claim 1 wherein said metal object is a coin or medal.

3. A method according to claim 2 wherein the metal powder is gold.

4. A method according to claim 2 wherein the metal powder is silver.

5. A method according to claim 1 wherein the metal powder has an average particle size in the range of about 0.5 to 15 microns diameter.

6. A method according to claim 1 wherein the sintering step is carried out at a temperature of about 400° F. for about 2 hours in a clean atmosphere.

7. A method according to claim 1 wherein compacting step (c) is carried out at a pressure of about 20 to 60 tons per square inch.

8. A method according to claim 1 wherein compacting step (c) is carried out in a dual action press.

9. A method according to claim 2 wherein said die cavity is defined by a die and collar assembly, the inside diameter of said collar being slightly smaller than the final diameter of the coin or medal.

10. A method according to claim 3 wherein the gold coin or metal has a relief of about 0.375 inches in height.

11. A method according to claim 4 wherein the silver coin or metal has a relief of about 0.375 inches in height.

12. A method for producing a cameo having at least one portion of its surface area raised more than 0.100 inches in relief, comprising the steps of:

a. providing a die having a die recess inset therein, said die recess engraved with the negative of the relief to be formed and greater than 0.100 inches in depth;
b. filling said die recess with a metal powder;
c. covering said die recess by placing a relatively resilient cover on the top of said die, said resilient cover in direct physical contact with said metal powder;
d. compacting said metal powder inside said die recess to form a relief compact by pressing said resilient cover against said metal powder;
e. sintering said relief compact to form a sintered compact;
f. inserting said sintered compact in a coining press having a coining die recess identical in shape and dimension to said die recess of step (a);
g. striking said sintered compact to form a final relief object having the desired surface finish; and
h. ejecting said final relief object.

* * * * *